G. H. ELLIS.
MACHINE FOR MOLDING LATH BOARDS.
APPLICATION FILED JULY 28, 1919.

1,343,909.

Patented June 22, 1920.
4 SHEETS—SHEET 1.

Inventor
George H. Ellis
By his Attorneys
Williamson Merchant

G. H. ELLIS.
MACHINE FOR MOLDING LATH BOARDS.
APPLICATION FILED JULY 28, 1919.

1,343,909.

Patented June 22, 1920.
4 SHEETS—SHEET 2.

Inventor
George H. Ellis
By His Attorneys

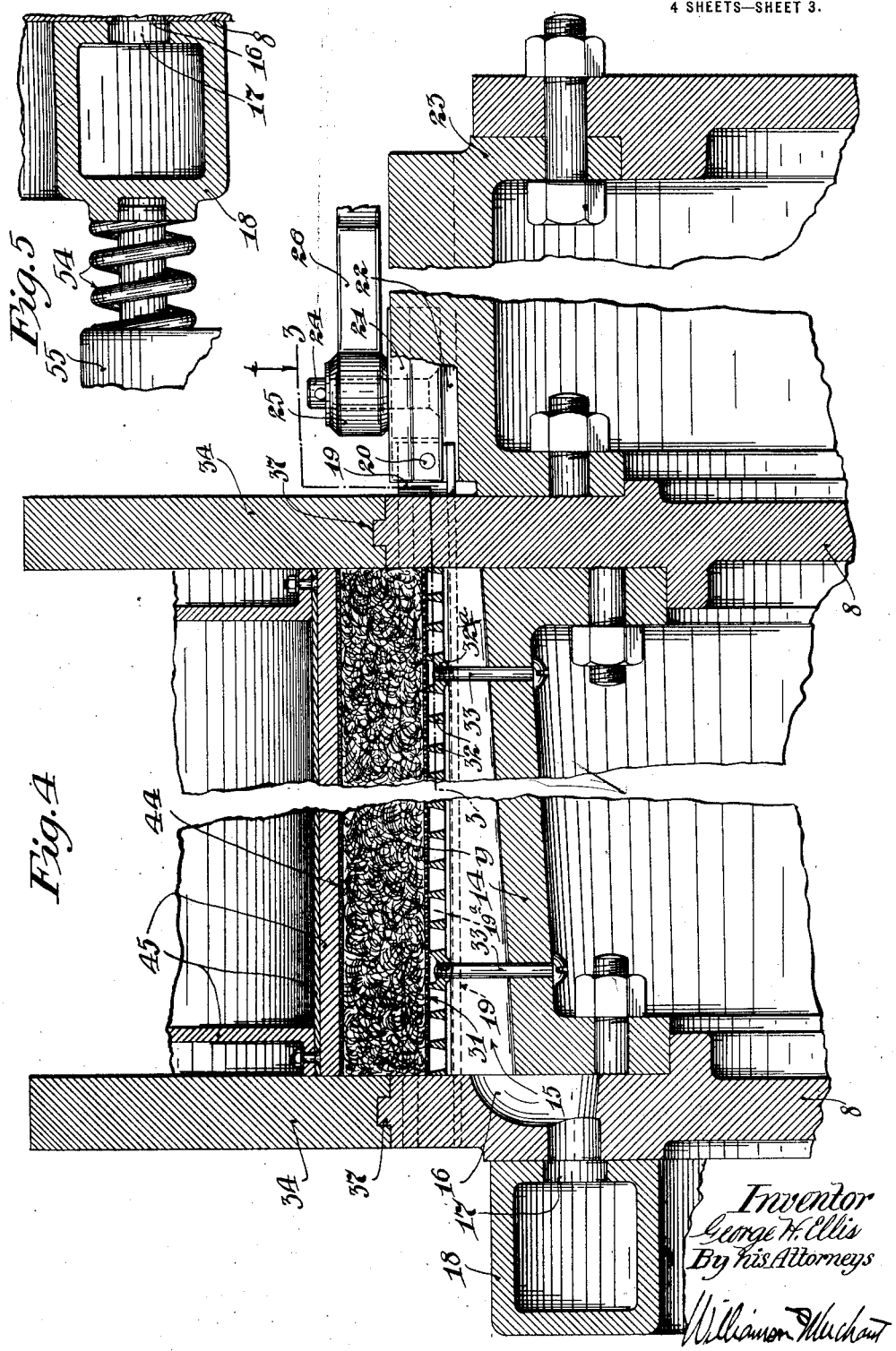

G. H. ELLIS.
MACHINE FOR MOLDING LATH BOARDS.
APPLICATION FILED JULY 28, 1919.

1,343,909.

Patented June 22, 1920.
4 SHEETS—SHEET 4.

Inventor
George H. Ellis
By his Attorneys

UNITED STATES PATENT OFFICE.

GEORGE H. ELLIS, OF ST. PAUL, MINNESOTA.

MACHINE FOR MOLDING LATH-BOARDS.

1,343,909.   Specification of Letters Patent.   Patented June 22, 1920.

Application filed July 28, 1919. Serial No. 313,884.

*To all whom it may concern:*

Be it known that I, GEORGE H. ELLIS, a citizen of the United States, residing at St. Paul, in the county of Ramsey and State of Minnesota, have invented certain new and useful Improvements in Machines for Molding Lath-Boards; and I do hereby declare the following to be a full, clear, and exact description of the invention, such as will enable others skilled in the art to which it appertains to make and use the same.

My invention relates particularly to means for producing commercially and economically a so-called insulating plaster board disclosed and claimed in my pending application for Letters Patent of the United States, S. N. 265,355, filed of date December 5, 1918, but the invention is, nevertheless, capable of much more extensive use for various similar or analogous purposes.

The invention involves a novel process or method and a novel machine, whereby the said method may be readily carried out commercially.

The improved machine, in its preferred form, is illustrated in the accompanying drawings, wherein like characters indicate like parts throughout the several views.

Referring to the drawings:

Fig. 4 is a vertical section, in section on the line 4—4 of Fig. 1, the parts being on a larger scale than in Fig. 1, and some parts being broken away;

Fig. 5 is a fragmentary detail, with some parts sectioned on the line 5—5 of Fig. 2;

Figure 1:
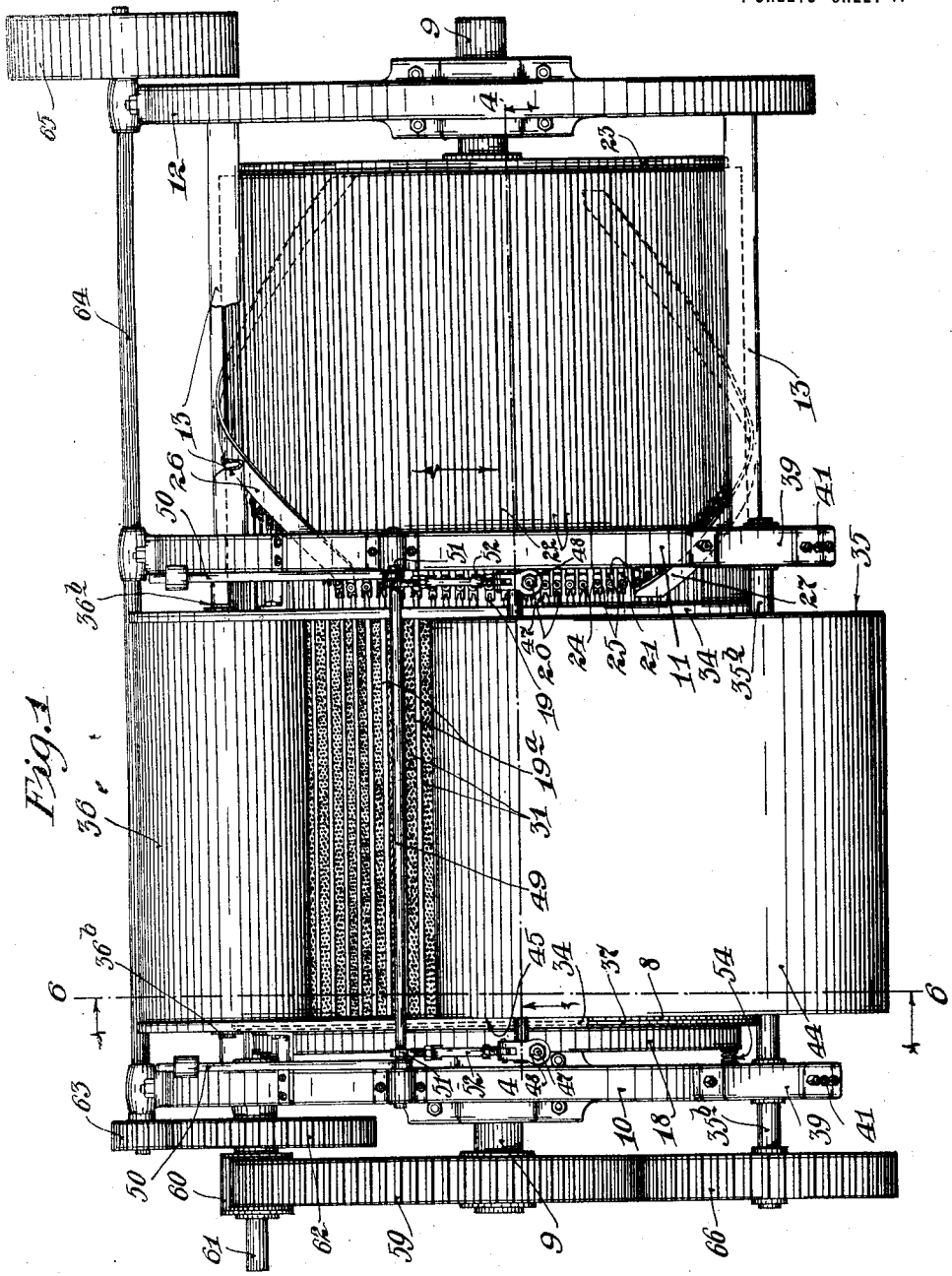
Figure 1 is a plan view of the improved machine.

As a highly important feature of this invention, I provide an endless traveling mold surface which includes slidable mold elements or core bars. This mold surface is adapted to form moldable material, such as wood pulp, paper pulp, or other fibrous more or less digested insulating material into the form of sheets or boards having grooves therein adapted to interlock with plaster. A material of this kind is disclosed in my application above identified, being therein designated as an "Insulating lath board."

The means for carrying the endless traveling mold surface is preferably a drum mounted to rotate on a horizontal axis. This drum, herein designated as an entirety by the numeral 8, is secured on a shaft 9 journaled in a framework made up of laterally spaced frames 10, 11 and 12, rigidly tied together by suitable tie bars 13, which latter, as shown, are of angle iron form.

The drum 8 has a cast cylindrical periphery 14 formed with circumferentially spaced channels 15 that are closed at their right-hand ends (see Fig. 4), and, at their left-hand ends, open into ports 16 in the left-hand side plates of the drum. Here it should be noted that the ports 16 are in constant or nearly constant communication with one or the other of ports 17 formed in an annular so-called suction manifold 18, throughout more than one-half the rotation of the drum. The drum rotates in the direction of the arrows, marked on Figs. 2 and 6, and the ports 17 extend approximately from the point marked A to the point marked B on Fig. 2. Said ports 17 are omitted in the manifold from the said point B to the point A.

The core bars 19 are disposed parallel to the axis of the drum and their flanged bases are mounted to slide in grooves formed in the webs of the cylinder 14 between the channels 15. At their outer edges, core bars 19 are formed with dove-tailed flanges 19ᵃ that are adapted to form dove-tailed grooves in the body of the lath board, as will presently appear. The said core bars, at their right-hand ends, project through the rim of the right-hand plate of the drum 8, and their outer ends are connected, preferably by pivots 20 to cross-heads 21. These cross-heads 21 are preferably T-shaped in cross section and have interlocking sliding engagement with correspondingly formed guide channels 22 formed in the periphery of a supplemental drum 23, which latter is secured to the main drum 8 and to the drum shaft 9. Guide channels 22 are, of course, parallel to the axis of the drum shaft and are circumferentially spaced to correspond to the spacing of the core bars.

Each cross-head 21 has a radially projecting stud 24 equipped with a roller 25. The cross-head rollers 25 are arranged to be engaged by two spiral cams, in the form of curved bars 26 and 27, rigidly attached to and supported by the frame 11 and certain of the cross tie bars 13. By reference to Fig. 1, it will be noted that the two cam bars 26 and 27 have reverse spiral trend. That is the one is like a right-hand thread and the other is like a left-hand thread, and each extends through considerably less than 180 degrees. Also, it will be noted that the left-hand end of the cam bar 27 projects toward the left considerably farther than the left-hand end of the cam bar 26, while the right-hand end of the cam bar 26 projects toward the right considerably farther than the right-hand end of the cam bar 27. The exact arrangement of these cam bars will more fully appear from the description of the operation.

The above described manifold 18 has a pipe-receiving boss 28 (see Fig. 2), that is adapted to be connected to any suitable means for producing a suction or partial vacuum in the said manifold. As shown, it is thus connected to the suction tube 29 of a vacuum pump 30. This vacuum pump is diagrammatically indicated on a very greatly decreased scale in Fig. 2.

To provide a perforate bottom for the endless mold surface of the drum, I provide perforate or reticulate surface plates 31, which fit between the core bars 19 just inward of their groove-forming outer edge flanges, 19ª. To support the perforate surface plates 31 and to adapt them to withstand the molding pressure, I provide grate sections 32, and these, as shown, are rigidly but detachably clamped in working position by screw rods 33, that work through radial perforations in the drum cylinder 14, and have threaded engagement with sleeves 32ª, cast integral with the respective grate sections. The bar portions, at the edges of the grate sections 32, rest on the ribs formed between channels 15 of the drum cylinder 14 and overlap the flanged bases of the core bars 19, and thus afford runways for the core bars that hold the core bars firmly seated throughout their sliding movement.

To receive the pulp or moldable material and to properly deliver the same to the upper portion of the drum, I provide a novel hopper structure. This hopper is made up of laterally spaced side plates 34 and two large and preferably hollow rollers 35 and 36, journaled to said side plates and working at their ends in close contact therewith. The hopper plates 34, at their under edges, are made segmental to fit the peripheries of the side plates of the drum 8, and the latter are preferably provided with circumferential joint flanges 37, that fit channels in the curved under edges of said hopper plates to form nearly liquid-tight joints (see Fig. 4). The rollers 35 and 36, respectively, are provided with pliable peripheral facings 35ª and 36ª, respectively, of rubber, felt or other suitable material. The shaft 35ᵇ of roller 35 is journaled in bearings 38 mounted to move in brackets 39 secured to the hopper plates 34. Coiled springs 40 re-act against the bearings 38 and set screws 41 that work through the outer portions of the brackets 39, and thus the said roller 35 is yieldingly pressed toward the drum.

The shaft 36ᵇ of the roller 36 (see Fig. 2) is journaled in bearings 42 that are free to slide downward in slots 43 formed in the hopper plates 34, and thus the roller 35 is gravity seated against the periphery of the drum 8.

A flexible endless presser apron 44 runs over the roller 35 and over a coöperating roller 45. This roller 45 is journaled to bearings 46 carried by the free ends of a pair of laterally spaced parallel arms 47, which, at their lower ends, are pivoted to the hopper plates 34. The said bearings 46 are made adjustable on the arms 47 by nuts 48 that have threaded engagement with said arms. Mounted in suitable bearings on the tops of the frames 10 and 11, is a rock shaft 49 which has a pair of weighted arms 50 and a pair of upstanding shorter arms 51. The arms 51 are connected to the respective bearings 46 by links 52 that are made longitudinally adjustable, preferably by means of suitable turn-buckles. The stock or the material to be molded may be delivered to the hopper by any suitable means, such as a delivery spout 53 leading from a suitable source of supply.

Figure 2:
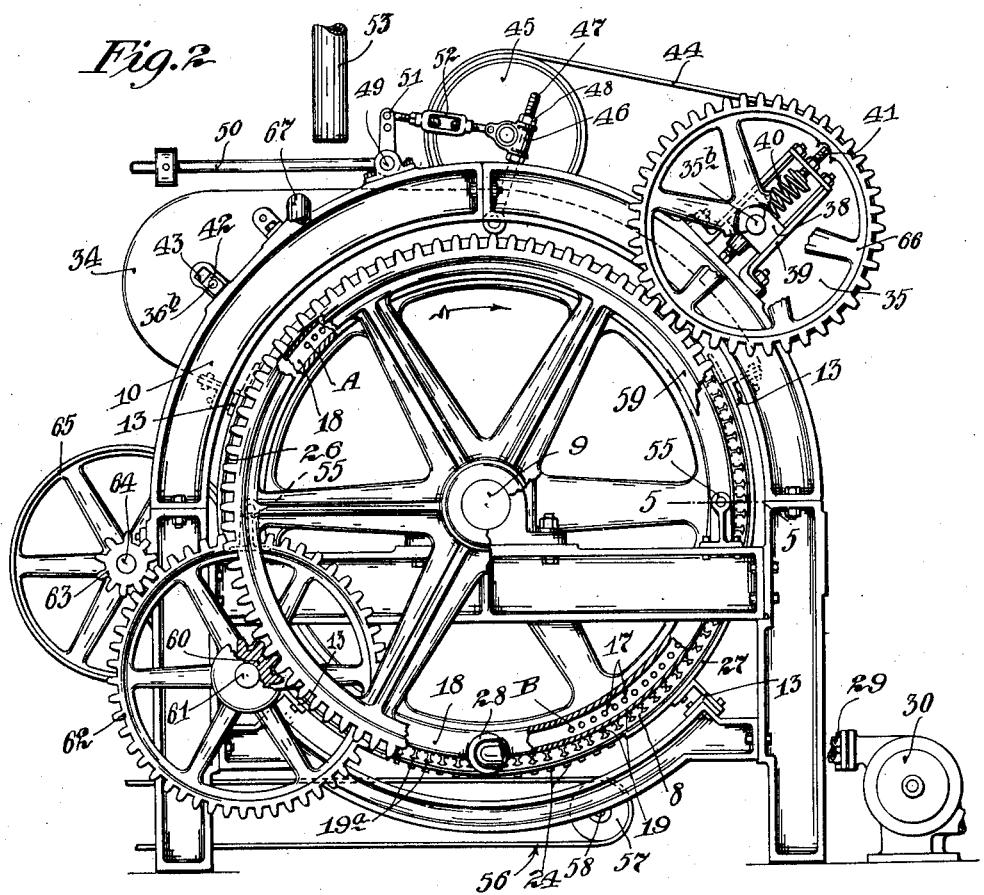
Fig. 2 is a left side elevation of the machine, with some parts broken away and some parts sectioned.
Figure 3:
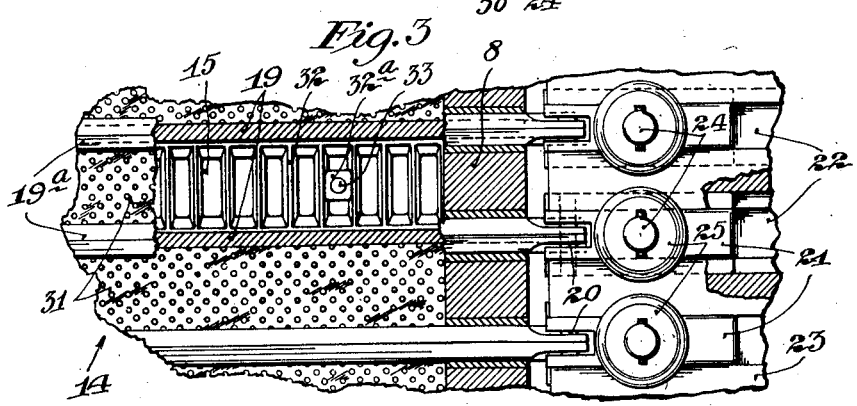
Fig. 3 is a detail in horizontal section taken approximately on the irregular line 3—3 of Fig. 4, some parts being broken away.

To hold the inner face of the suction manifold 18 tightly pressed against the smooth face of the adjacent plate of the drum 8, coiled springs 54 are shown as interposed between said manifold and diametrically opposite brackets 55 on the frame 10 (see Figs. 2 and 5).

Figure 6:
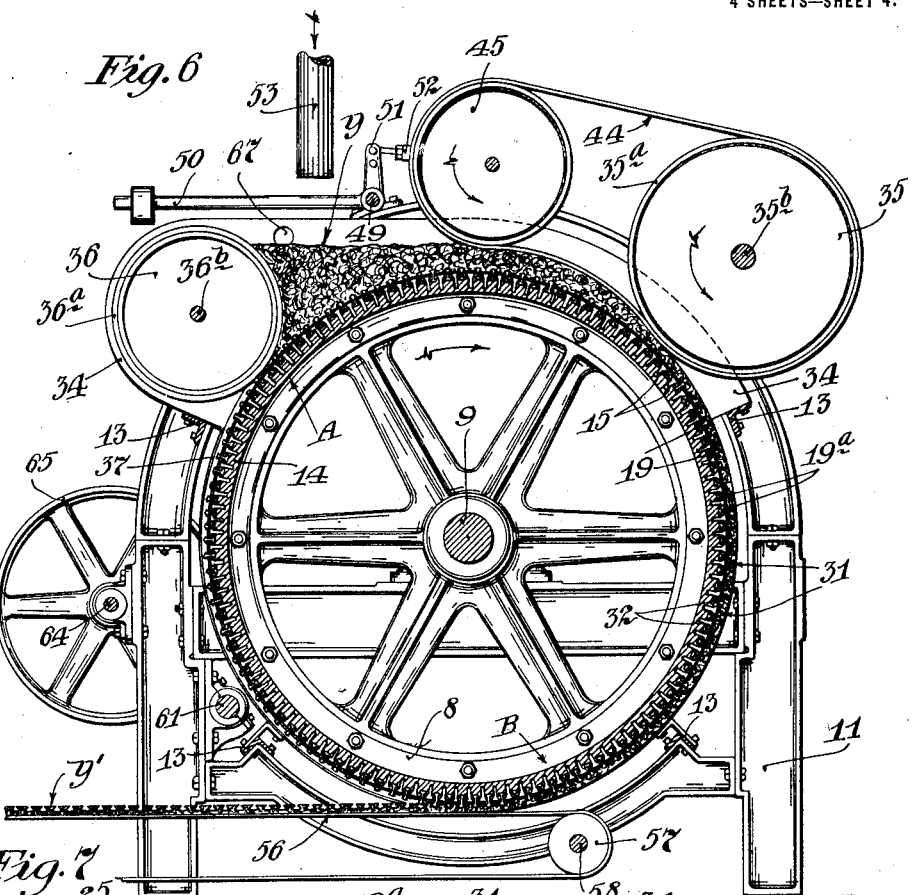
Fig. 6 is a vertical section taken on the line 6—6 of Fig. 1.
Figure 7:
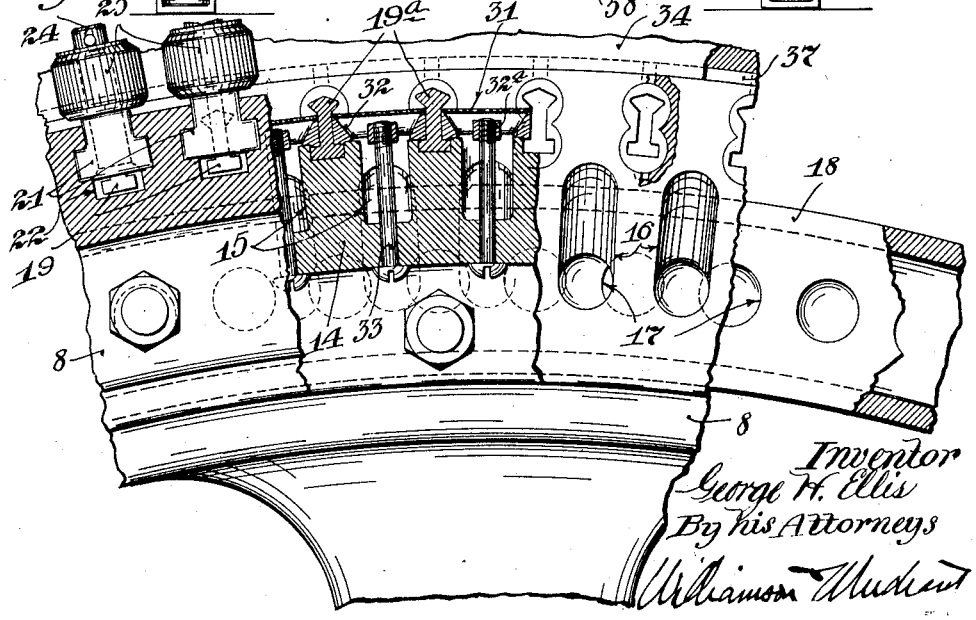
Fig. 7 is a fragmentary section, with parts broken away and with parts sectioned on various different lines and illustrating the relation between the drum, the mold bars, the suction manifold and certain other parts.

The finished product, to-wit: the so-called "lath board" will be delivered onto an endless apron 56 arranged to run horizontally over suitable guiding and driving rollers 57, one of which is shown in Fig. 6. The shaft 58 of this roller 57 may be driven by any suitable means.

The drum shaft 9 is provided with a large spur gear 59 at one end, and this gear meshes with a pinion 60 on a countershaft 61 suitably journaled in the frames 10 and 11. The shaft 61 also carries a spur gear 62 that meshes with a pinion 63 on a driving shaft 64 that is journaled in suitable bearings on the frames 10, 11 and 12 (see Fig. 1). Power will be transmitted to the machine through a belt, not shown, but which will run over a pulley 65 on the driving shaft 64.

The shaft 35$^b$ of the hopper roller 35, at one end, is provided with a spur gear 66 that meshes with the large drum gear 59, and thus the roller 35 is driven from the drum. The teeth of the gears 59 and 66 are long enough to permit such movements as may be given to the roller 35 in its action on the stop. Here it may be stated that the roller 35, which acts under heavy spring tension, serves not only as a hopper roller, but as a compressing roller to press and compact the fibrous stock or moldable material. In Fig. 6, the fibrous stock, which may be assumed to be pulp or waste paper stock, is indicated by the character Y, and the completed lath board is indicated by the character Y'. So far as this invention is concerned, however, the stock Y may be any material capable of being molded to form a plaster board or analogous material. Surplus stock or pulp from the hopper may overflow through a suitable port 67.

*Operation.*

The operation of the machine summarized is as follows:—

The stock delivered into the hopper will be in a plastic semi-fluid condition and will readily spread itself out, so that it can be formed into a thick sheet or board. Under rotation of the drum, the hopper roller 36 will be driven by gravity and will maintain such contact with the positioned core bars that the heavy stock will be prevented from flowing from the hopper at that point. Under rotation of the drum, as stated, to wit: in the direction of the arrows (Figs. 2 and 6), the roller 35 will be positively driven and the compressing or feeding apron 44 on the roller 45 will be frictionally driven. The proper frictional tension will be put on the said apron 44 by the weighted arms 50. The thickness of the sheet or board to be made may be varied by adjustments of the bearings 46 on the arms 47, which adjustments set the roller 45 closer to or farther from the upper mold surface of the drum 8, so as to thereby vary what may be treated as the mouth opening leading to the compressing device made up of the apron 44 and roller 35.

As the stock passes under the apron 44, it is subjected to an increasing pressure, and, as it passes under the roller 35, it is subjected to the final and maximum pressure, and is given its final form.

Those core bars 19 that are on the upper portion of the drum and between the points of contact between the drum and the rollers 36 and 35 will be forced into the drum and will extend completely across the bottom of the hopper, so that their exposed groove-forming portions 19$^a$ may be embedded in the stock that is to form the sheet or board. At the time or shortly after the core bars pass the points of contact between the drum and roller 35, the rollers 25 of their respective cross-heads 21 will come into contact with the inner or left-hand ends of cam bar 27, and, under further rotation of the drum, this cam bar, acting on said rollers, will gradually force or slide the core bars toward the right, until the said core bars are completely withdrawn from the formed sheet or board.

The core bars will remain in their completely withdrawn positions, while the formed sheet is moving from the drum onto the receiving apron or conveyer belt 56, and shortly thereafter the rollers of the said cross-heads will engage the right-hand or outer end of the cam bar 26. Under further rotation of the drum, the cam bar 26, acting on said rollers, will force the core bars back to working positions, so that they will extend across the bottom of the hopper, when, a little later, they are moved upward under the hopper roller 36.

It is highly important to note that by the means described the grooved so-called lath board is first formed on the drum, starting with the grooves thereof, at the under side of the sheet, but ending by delivery of the complete sheet or board with its smooth or unbroken back surface downward in direct contact with the receiving belt, and with its groove or rib surface, which is formed to interlock with the plaster, turned upward. The grooved or ribbed surface of the board or sheet, when first delivered from the drum, will not be thoroughly dry, and hence, would be easily broken or distorted, and hence, the obvious importance of the above noted manner of delivery.

From the time that the stock which is to form or has formed the grooved board or sheet, first contacts with the mold surface at A until it passes from the drum onto the receiving apron approximately at B, it is subject to suction or partial vacuum on its inner or mold-engaged surfaces. This suction accomplishes two important results, to-wit:—it assists greatly in causing the stock to take the complete form of the mold surfaces, and it extracts from the stock the greater portion of the water, so that the sheet delivered onto the conveyer belt will be freed from most of the water, previously contained therein, and may be subsequently quickly dried. Also this suction keeps the sheet tightly drawn against the mold surface of the drum, while it is moving from the roller 35 onto the receiving apron.

The drawings of this application illustrate what I, at present, believe to be the best form of automatic machine for making material of the character considered, but it will be understood that the machine is capable of many modifications, within the broad scope of my invention, and that many of the features thereof may be incorporated in hand-operated as well as power-driven automatic machines. For example, certain of the broad claims in this case will cover a device or hand-operated machine such as disclosed but not claimed in my pending application, S. N. 265,355, filed of date December 5, 1918, and entitled "Insulating plaster board."

What I claim is:—

1. A molding device having a mold surface adapted to form a molded sheet and including core bars that are slidable to and from working positions and in cross section having a form to produce plaster interlocking grooves in the molded sheet.

2. A molding device having a mold surface adapted to form a molded sheet and including removable core bars, and means for automatically moving said core bars to and from working position.

3. A molding device having a mold surface including removable core bars, said mold surface also having perforate portions between the core bars.

4. A molding device having a mold surface including core bars that are slidable to and from working positions and in cross section having a form to produce plaster interlocking grooves in the molded sheet, said mold surface also having perforate surface-forming sections located between the core bars below the groove-forming portions thereof.

5. A molding device having a mold surface adapted to form a molded sheet and including slidable cores for forming plaster interlocking surfaces in the formed sheet in combination with means for pressing the stock against the mold surface.

6. A molding device having a mold surface adapted to form a molded sheet and including slidable cores for forming plaster interlocking surfaces in the formed sheet in combination with means for pressing the stock against the mold surface, and for subjecting the mold-engaged surface of the stock to partial vacuum.

7. In a machine of the kind described, an endless traveling mold surface having imperforate or non-porous core bars and perforated surfaces between said core bars, mechanical means for pressing the stock against said mold surface, and pneumatic means for subjecting the mold engaged surfaces of the fibrous stock to partial vacuum, through said perforated molded surfaces.

8. In a machine of the kind described, an endless traveling mold surface, slidable core bars carried by and spaced upon said mold surface, means for automatically sliding said core bars, mechanical means for pressing fibrous stock against said mold surface, said mold surface having perforate surfaces between said core bars, pneumatic means for subjecting the mold-engaged surface of the fibrous stock to partial vacuum through the perforations thereof, and means for moving said molded surface and fibrous stock while said stock is thus subjected to pressure and partial vacuum.

9. In a machine of the kind described, an endless traveling mold surface including slidable core bars, means for applying moldable material to said mold surface, and means for moving said mold surface.

10. In a machine of the kind described, an endless traveling mold surface including slidable core bars, means for applying moldable material to said mold surface, means for moving said mold surface, and means for automatically withdrawing said mold bars from the mold material and for restoring said mold bars to working positions.

11. In a machine of the kind described, the combination with an endless traveling mold surface including endwise movable groove-forming core bars, means for applying moldable stock to said mold surface at the upper portion thereof, and means for delivering the molded sheet from the bottom of said mold surface with the grooved surface thereof uppermost.

12. In a machine of the kind described, the combination with a rotary drum having a surrounding mold surface including endwise movable groove-forming core bars carried by said drum, means for applying moldable material to said mold surface at the upper portion of said drum, and means for delivering the molded material from the bottom of said drum with its grooved surface uppermost.

13. A molding device having mold surfaces adapted to form a molded sheet and including core bars that are movable to and from working position in respect to the sheet and in cross section having a form to produce plaster interlocking grooves in the molded sheet.

In testimony whereof I affix my signature in presence of two witnesses.

GEORGE H. ELLIS.

Witnesses:
CLARA DEMAREST,
BERNICE G. BAUMANN.